Figure 1:
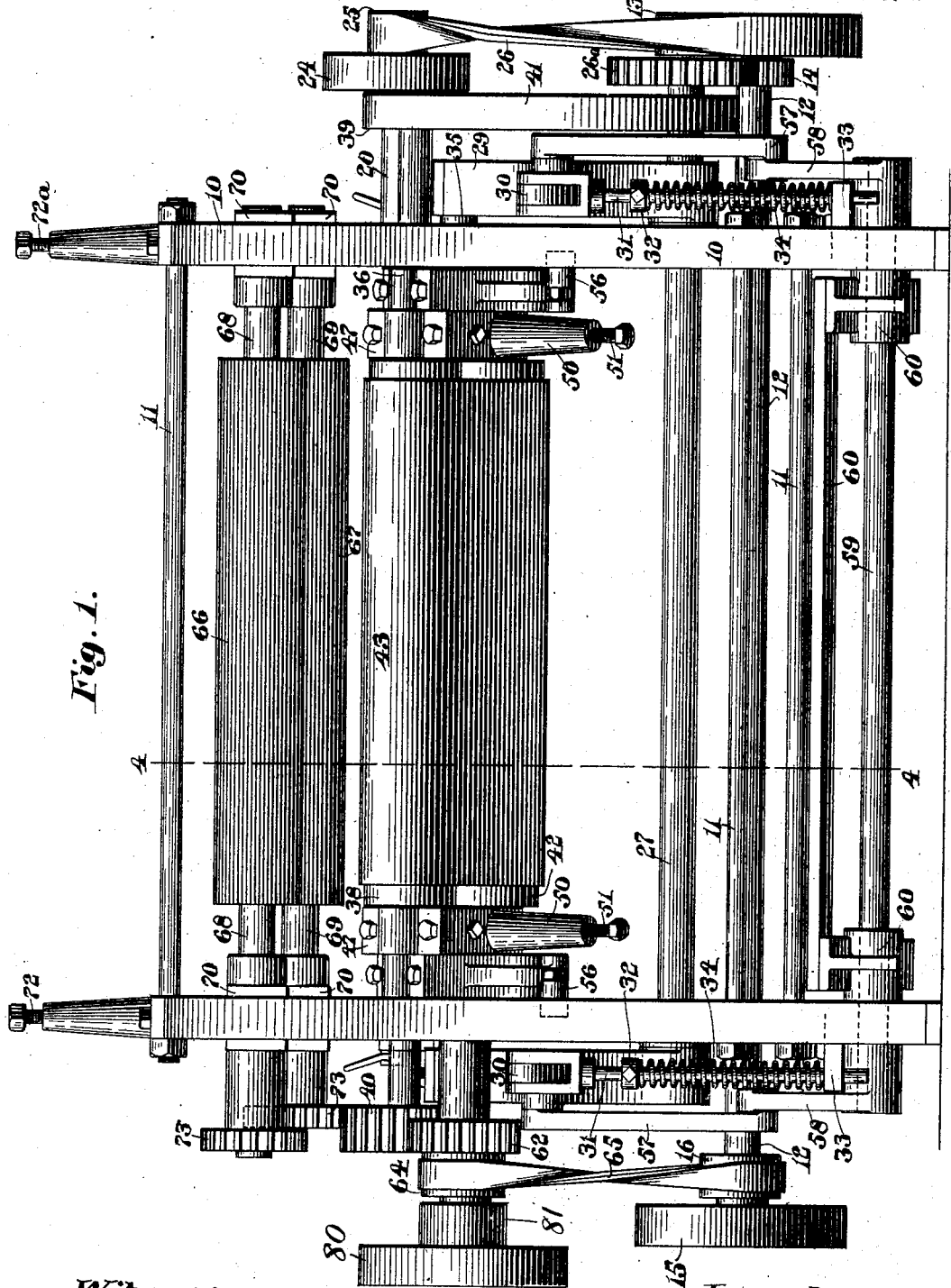

No. 745,353. PATENTED DEC. 1, 1903.
A. A. HUTCHINSON.
HIDE WORKING MACHINE.
APPLICATION FILED NOV. 3, 1902.
NO MODEL. 8 SHEETS—SHEET 1.

Witnesses:
Otis W. Howe.
Nathan C. Lombard 2nd

Inventor:
Albert A. Hutchinson,
by Walter E. Lombard.
Atty

No. 745,353. PATENTED DEC. 1, 1903.
A. A. HUTCHINSON.
HIDE WORKING MACHINE.
APPLICATION FILED NOV. 3, 1902.
NO MODEL. 8 SHEETS—SHEET 3.

Witnesses:
Otis W. J. Howe
Nathan C. Lombard 2nd

Inventor:
Albert A. Hutchinson,
by Walter E. Lombard
Atty.

No. 745,353. PATENTED DEC. 1, 1903.
A. A. HUTCHINSON.
HIDE WORKING MACHINE.
APPLICATION FILED NOV. 3, 1902.
NO MODEL. 8 SHEETS—SHEET 5.

Witnesses:
Otis W. Howe
Nathan C. Lombard 2nd

Inventor:
Albert A. Hutchinson,
by Walter E. Lombard
Atty.

No. 745,353. PATENTED DEC. 1, 1903.
A. A. HUTCHINSON.
HIDE WORKING MACHINE.
APPLICATION FILED NOV. 3, 1902.
NO MODEL. 8 SHEETS—SHEET 6.
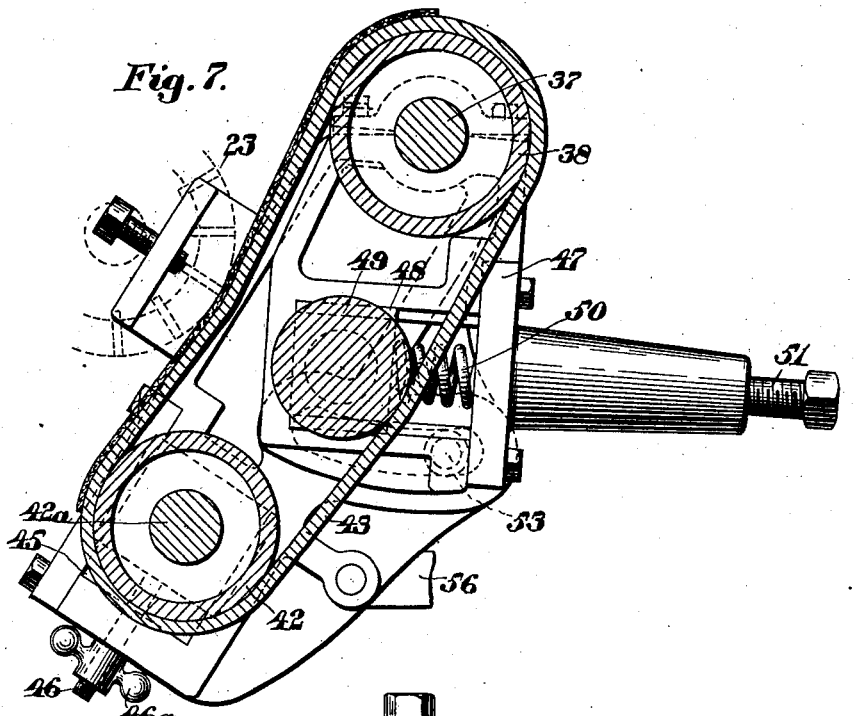
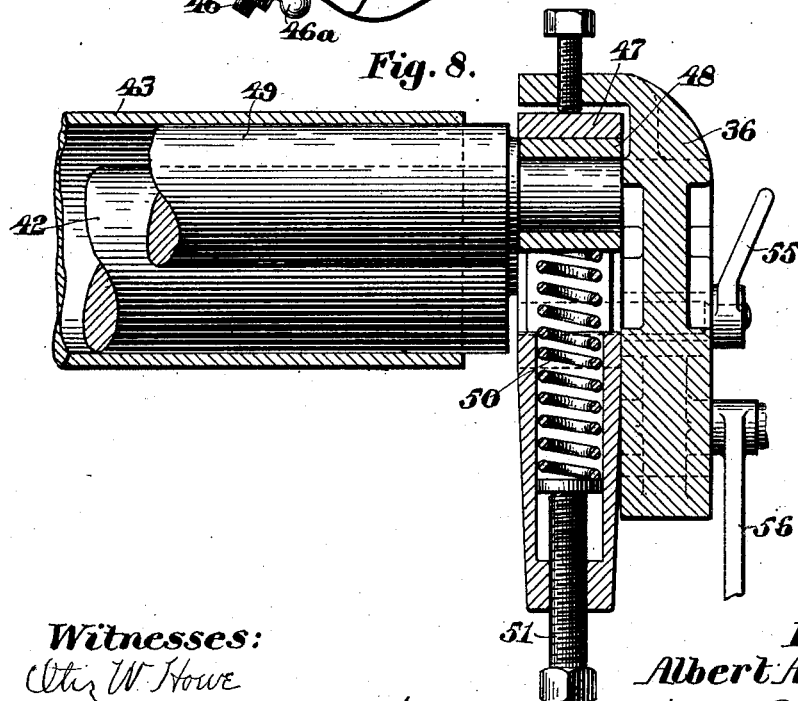
Witnesses:
Otis W. Howe
Nathan C. Lombard 2nd
Inventor:
Albert A. Hutchinson,
by Walter E. Lombard.
Atty.

No. 745,353. PATENTED DEC. 1, 1903.
A. A. HUTCHINSON.
HIDE WORKING MACHINE.
APPLICATION FILED NOV. 3, 1902.
NO MODEL. 8 SHEETS—SHEET 7.

Witnesses:
Josiah E. Reid.
Nathan C. Lombard 2nd.

Inventor:
Albert A. Hutchinson,
by Walter E. Lombard
Atty.

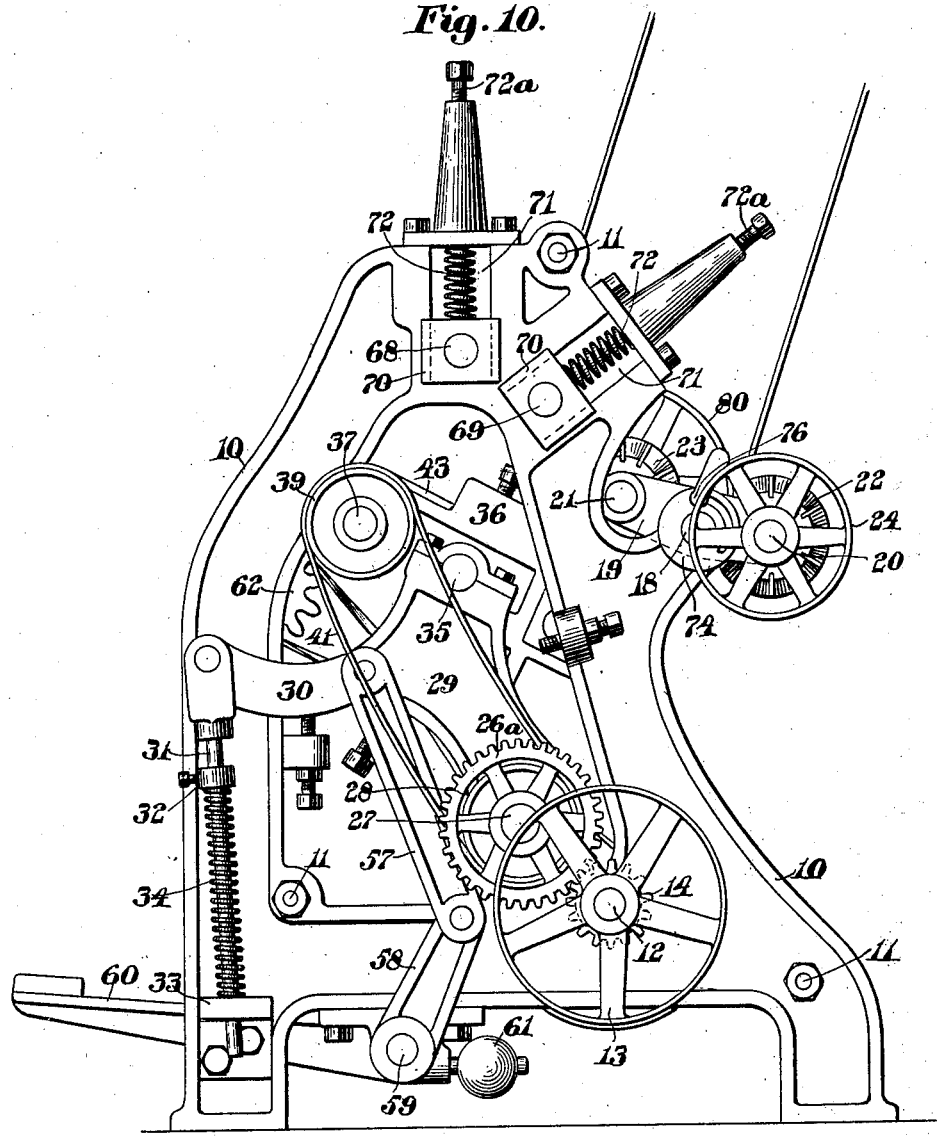

No. 745,353. Patented December 1, 1903.

UNITED STATES PATENT OFFICE.

ALBERT A. HUTCHINSON, OF WINCHESTER, MASSACHUSETTS.

HIDE-WORKING MACHINE.

SPECIFICATION forming part of Letters Patent No. 745,353, dated December 1, 1903.

Application filed November 3, 1902. Serial No. 129,974. (No model.)

*To all whom it may concern:*

Be it known that I, ALBERT A. HUTCHINSON, a citizen of the United States of America, and a resident of Winchester, in the county of Middlesex and State of Massachusetts, have invented certain new and useful Improvements in Hide-Working Machines, of which the following is a specification.

This invention relates to machines for removing the hair and superfluous flesh from hides, and has for its principal object the production of a machine which may be adapted readily for either purpose with but very slight adjustment in the mechanism.

It is intended by this invention to produce a machine whereby the work of the operator will be greatly reduced and the efficiency of the machine greatly increased. This is partly accomplished by an automatic mechanism which feeds the hide into a position to be operated upon by the knife-cylinder, thereby materially assisting the operator in his work.

A further improvement is the arrangement of the hide-support and its operating parts, whereby the hide-support is placed in the most convenient position for feeding in the hides when the hide is not being operated upon and whereby the said hide-support by the movement of the treadle to put the machine into operation is moved into the most convenient position to coöperate with the knife-cylinder.

Another improvement is the combination of a movable hide-support coacting with a fixed hide-support, which are both arranged at such an angle when the hide is being fed over the same to be operated upon by the knife-cylinder that the hide supported thereby is kept perfectly flat and free from wrinkles, thus preventing much injury which often occurs in other machines.

This invention consists in certain novel features of construction and arrangement of parts, which will be readily understood by reference to the description of the drawings and to the claims to be hereinafter given.

Figure 2:
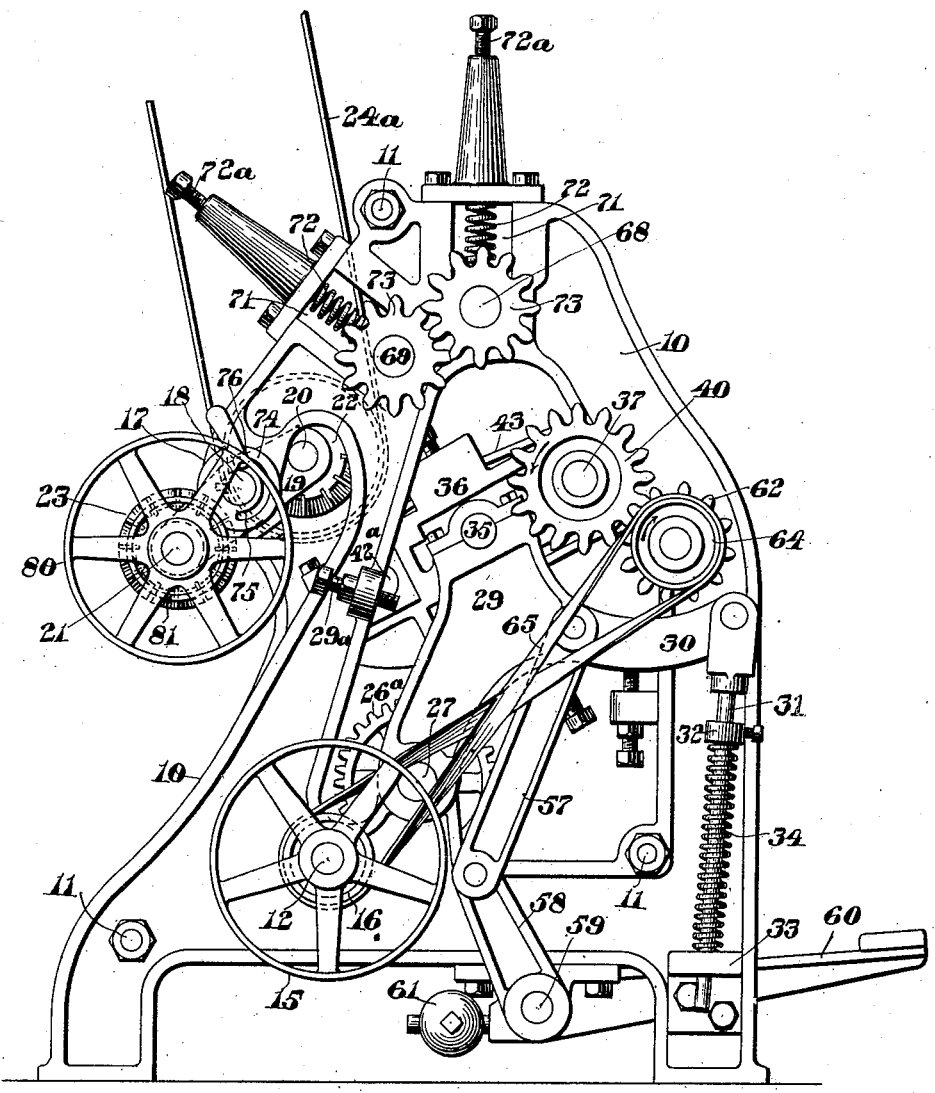
Figure 3:
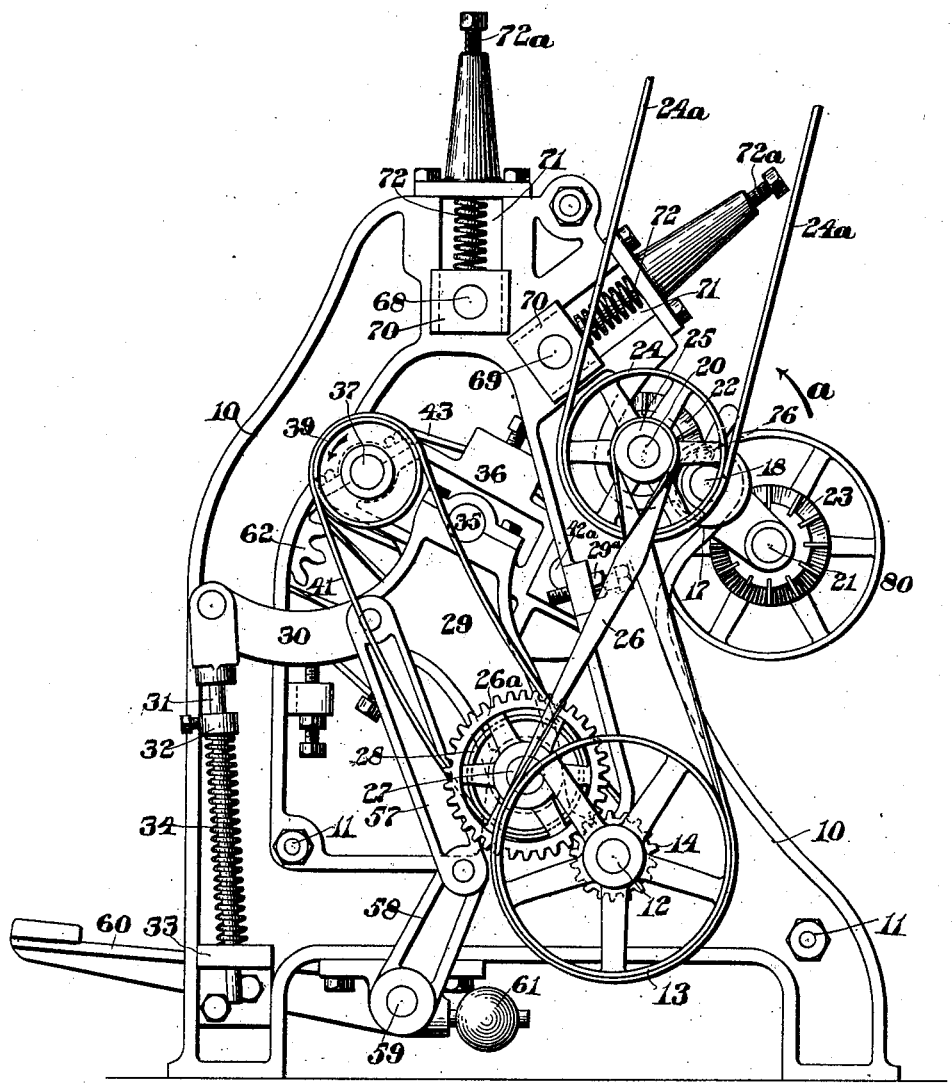
Figure 4:
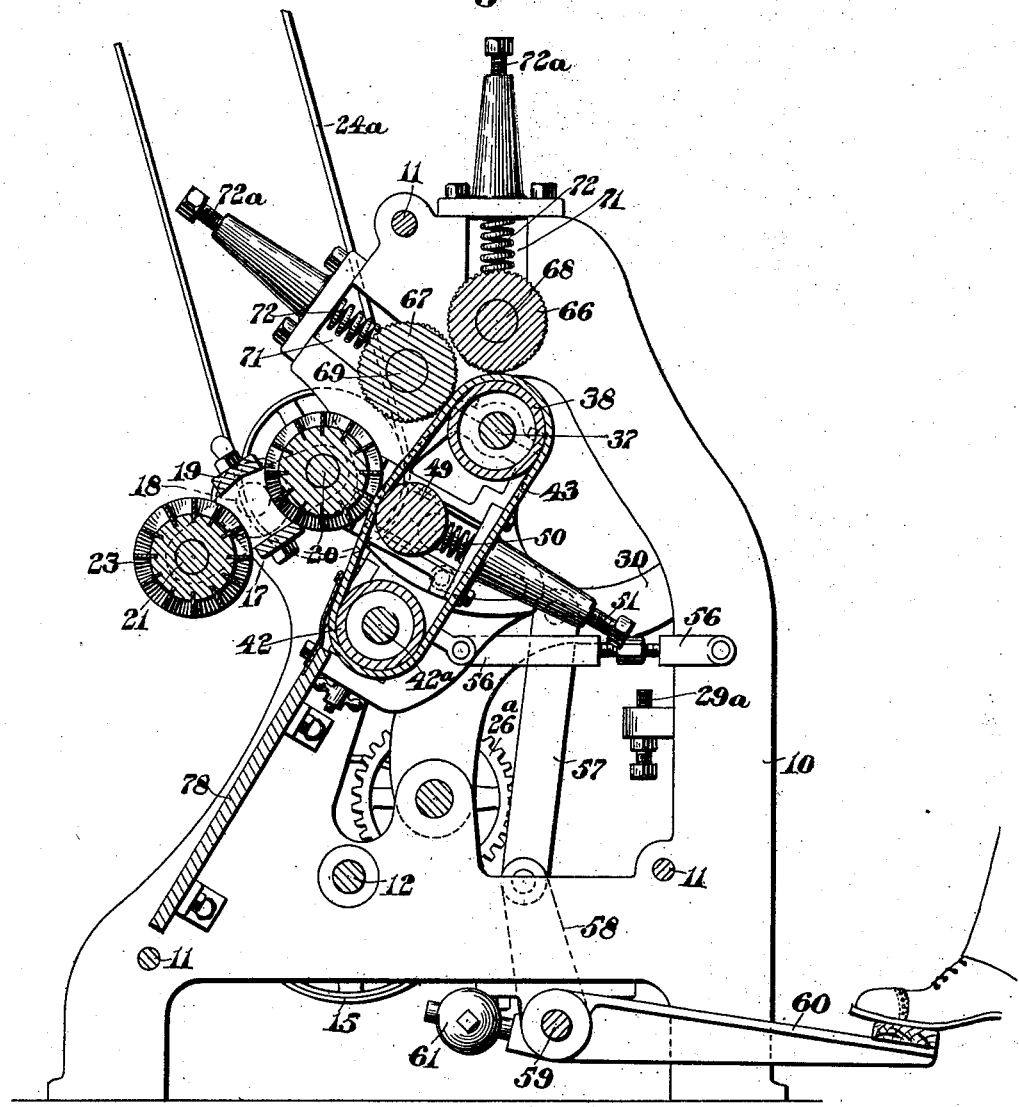
Figure 5:
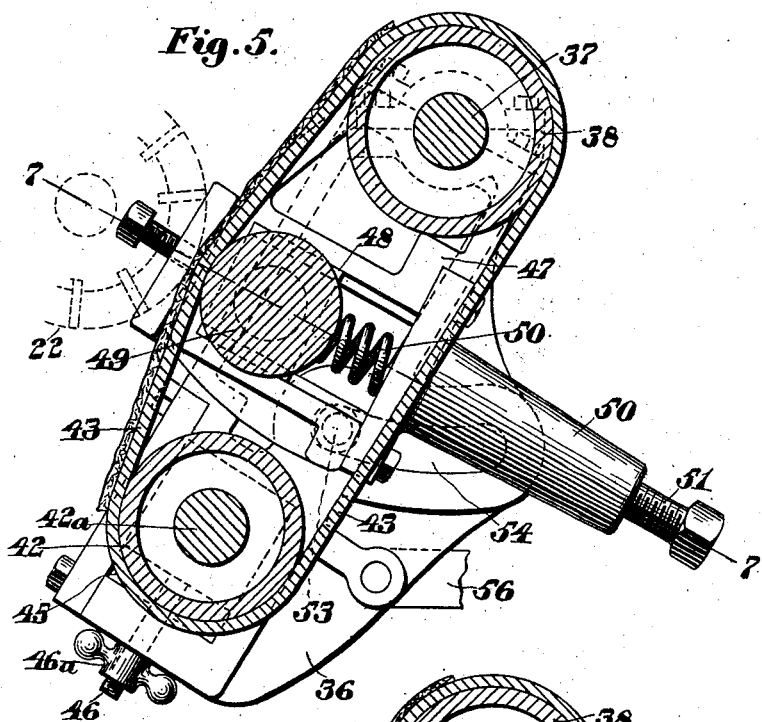
Figure 6:
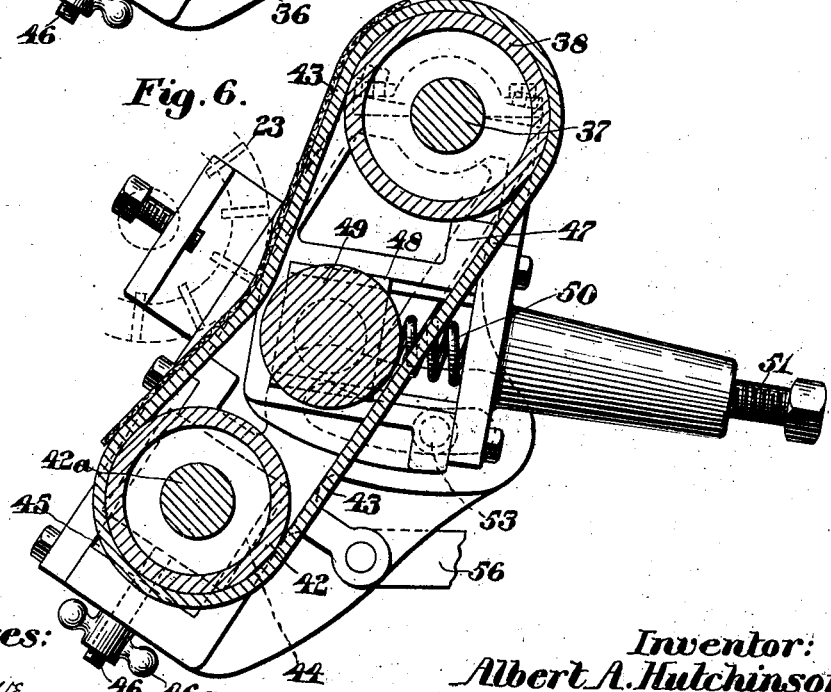
Figure 9:
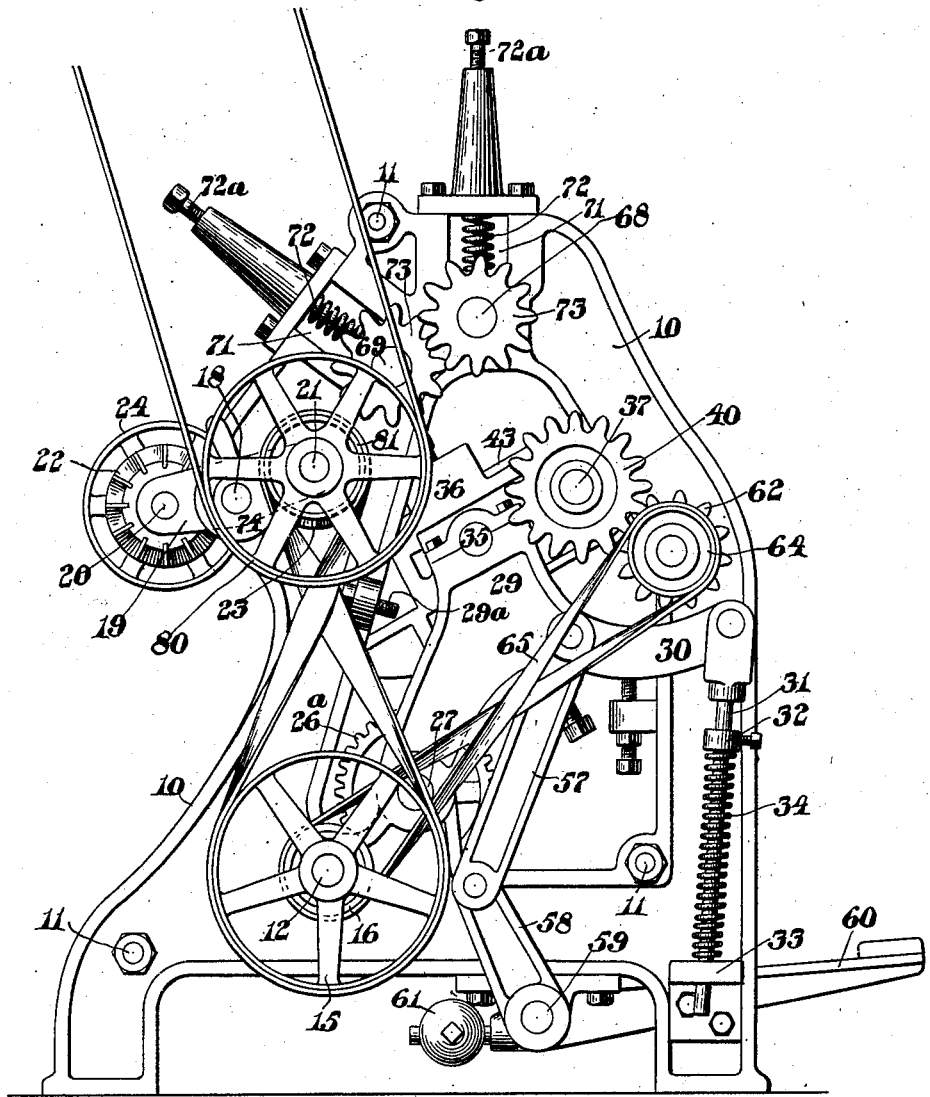

Of the drawings, Figure 1 represents a front elevation of a machine embodying this invention. Fig. 2 represents an elevation of the left end of the same. Fig. 3 represents an elevation of the right end of the same. Fig. 4 represents a cross-sectional elevation of the same, the cutting-plane being on line 4 4 on Fig. 1. Fig. 5 represents a cross-sectional elevation through the apron and bed-rolls, showing the apron in position for fleshing. Fig. 6 represents the same parts adjusted for unhairing. Fig. 7 represents the same parts in position for unhairing with the bed-roll in position to tighten the apron. Fig. 8 represents a sectional elevation on line 7 7 on Fig. 5; and Figs. 9 and 10 represent, respectively, elevations of the left and right ends of the machine with the unhairing-cylinder in position to operate.

Similar characters designate like parts throughout the several figures of the drawings.

To support the working parts of the machine, a main frame is preferably provided, made up of end frames 10 10 and tie-girths 11 11. In the frames 10 is mounted a shaft 12, having secured thereon at one end outside of said frames a large pulley 13 and a small pinion 14, while upon the other end thereof are mounted large and small pulleys 15 and 16. The rear of the frames 10 are provided with bearings 17 17 for trunnions 18 of the frame 10, which has mounted therein two shafts 20 21, each having secured thereon a knife-cylinder 22 and 23.

The knife-cylinder 22 on the shaft 20 is such as is ordinarily used for fleshing hides, while the knife-cylinder 23 on the shaft 21 is such as is commonly used for unhairing. The distance of the shaft 21 from the pivot 18 is slightly in excess of the distance of the shaft 20 from that pivot.

On the right-hand end of the shaft 20 are mounted two pulleys 24 25, the larger of which, 24, being belted by belt 24$^a$ to a counter-shaft (not shown) from which the fleshing-cylinder is driven at a high rate of speed. The smaller pulley 25 is connected by a cross-belt 26 to the pulley 13, which, with its shaft 12, is driven thereby. The pinion 14 on the shaft 12 meshes with the gear 26, loosely mounted on a shaft 27 and having secured thereto and turning therewith the pulley 28.

On the shaft 27 are loosely mounted two rocker-arms 29, having arms 30, extending toward the front of the machine, to which are pivoted rods 31, provided with adjustable collars 32, between which and brackets 33, through which said rods pass, are interposed springs 34, tending to move said rocker-arms toward the rear of the machine. The holes in the brackets 33, through which said rods 31 pass, are of sufficient size and shape to permit the free movement of said rods therein as the rocker-frame 29 moves to and fro about its pivot. The tension of said springs 34 may be regulated by adjusting the collars 32, as is obvious. In bearings in said rocker-arms 29 are mounted the trunnions 35 of the side frames 36, in the front ends of which is mounted the shaft 37, having secured thereto between said frames the apron-roll 38, and having also secured thereto outside of said frames 36 the pulley 39 at the right-hand end and the gear 40 at the opposite end. The pulley 39 is connected by the belt 41 to the pulley 28 and is revolved thereby when the rocker-frame 39 is moved about its pivot to permit the hide to be operated upon. The side frames 36 have also adjustably mounted therein a second apron-roll 42, upon which and the roll 38 is mounted an endless apron 43, of rubber or any other suitable material. The roll 42 is secured upon a shaft 42$^a$, mounted in bearings in blocks 44, which may be adjusted in slots 45 by means of the screws 46 and nuts 46$^a$ to tighten the apron 43. Adjustable stops 29$^a$ are provided to limit the movement of said rocker-arms 29 in either direction.

On the shaft 37, outside of the apron-roll 38, are hung swinging arms 47, provided with boxes 48, in which is mounted a bed-roll 49, said boxes being provided with spring tension devices 50, which may be adjusted by means of the screws 51. The arms 47 are provided with lugs 53, which project through slots 54 in the side frames 36, thereby permitting the arms 47 to be moved about their pivot 37, said lugs being provided with clamp-nuts 55, whereby said bed-roll may be clamped in any desired position. This feature is an important part of this invention, for it readily provides a means whereby two knife-cylinders for two distinct purposes may be used in the same machine, inasmuch as when the bed-roll 49 is clamped in the position shown in Fig. 5 it provides a firm practically-unyielding surface for the fleshing-knife cylinder to coöperate with, while when clamped in the position shown in Fig. 6 it permits the unhairing-knife cylinder to coöperate with the apron 43, which when unbacked by the bed-roll forms a very yielding surface, which is most desirable when the hide is being operated upon in this manner. The tension of the apron when the unhairing-cylinder is in operation may be varied by moving the bed-roll into contact with the lower portion thereof, as indicated in Fig. 7.

The side frames 36 are connected to the frame 10 by adjustable radius-arms 56, which change the inclination of the apron as the rocker-frame 29 is moved to the rear about its pivot 27. This movement of the rocker-frame toward the rear of the machine is effected by the toggle 57 58, the upper member 57 of which is a link pivoted to the arm 30 of the rocker-frame 29 and connected at the lower end to the lower member 58, securely mounted upon the rocker-shaft 59. A treadle 60, also securely mounted upon the rocker-shaft 59, serves to straighten the toggle members 57 58 to move said rocker-frame 29 to the rear. The weight 61 serves to break the toggle when the operator's foot is removed from the treadle, and the weight of the frames causes them to return to their normal position.

When the parts are in their normal positions and the hide is not being operated upon, as shown in Figs. 2 and 3, the gear 40 on the apron-roll shaft 37 meshes with the idler-gear 62, mounted on a stud 63 on the frame 10, said gear 62 being mounted upon the hub of the pulley 64, which is connected by a cross-belt 65 to the small pulley 16 on the shaft 12 and is revolved thereby in the direction indicated by arrows on Fig. 3 of the drawings. By this means the apron when in its normal position is moved in a direction to feed the hide into a position to be operated upon by the knife-cylinder.

In the upper portion of the frames 10 are mounted two grooved feed-rolls 66 and 67, said feed-rolls being secured to shafts 68 69, having bearings in boxes 70, movably mounted in slots 71 in said frames 10, and each provided with a spring tension device 72, regulated by a screw 73. The shafts 68 69 have secured to their left-hand ends gears 73 74, which are adapted to mesh with the gear 40 on the apron-roll shaft 37 when the hide is being operated upon and be revolved thereby, thus causing the feed-rolls 66 and 67 to coöperate with the apron 43 to feed the hide beneath the knife-cylinder.

On the trunnions 18 of the frame 19 are secured disks or plates 74, provided with slots 75, through which extend clamping-screws 76, mounted in the frame 10, and by which the frame 19 may be held securely in the position shown in the drawings or in a similar position with the unhairing-cylinder in position to operate.

To bring the unhairing-cylinder 23 into position to operate upon the hide, the belts 24$^a$ and 26 are removed and the frame 19 moved about its trunnions in the direction of the arrow $a$ on Fig. 3 until the knife-cylinder 23 reaches the position in which the fleshing-cylinder 22 is shown in the drawings, when the frame 19 will be securely clamped, and the belts 24$^a$ and 26, which were removed from the right end of the machine, will be similarly placed upon the pulleys on the left of the machine. The machine will then be in condition for unhairing.

It will be seen by reference to Fig. 4 that the hide support or apron is in an inclined position when the hide is being operated upon and that a table 78 is provided in continuation of said hide-support, so that the hide as it is fed to a position beneath the knife-cylinder 22 is supported at all times and is fed to the knife-cylinder in a perfectly flat condition, free from wrinkles, thereby preventing the injury to the hide which often occurs when the hide is fed over a roller and is unsupported in any other way.

While it is a very great advantage for the operator to have his hide-support inclined considerably when the hide is being operated upon, it is not convenient to have so much of an inclination of the hide-support when the hide is being fed into an operative position, as the operator desires to see every portion of the hide as it goes into place. By means of the rocker-frame 29, the pivoted frame 36, carrying the hide-supporting apron, and the radius-arms 56 a convenient mechanism is provided whereby the hide-support is placed at the most advantageous angle for placing the hide thereon, and by the movement of the foot to start the machine the inclination of the hide-support is changed to a position most convenient for the hide to be fed to the knife-cylinder and operated upon. To be able to accomplish this is a great saving in time and labor of the operator, while the operation upon the hide is more successfully accomplished.

Another important advantage of this invention is the production of a fleshing apparatus and an unhairing apparatus in one machine so arranged that by very slight adjustment of the parts the machine may be adapted for use for either purpose.

A further advantage of this invention is the arrangement for moving the hide-support into position to coöperate with the knife-cylinders, whereby very little strain is put upon the operator to effect the movement, the toggle mechanism being so arranged as to make the power to be applied to the treadle very slight, while the movement of the rocker-arms 29 is assisted by the springs 34.

The shaft 21 has secured to its left end a pulley 80, which is belted to a counter-shaft (not shown) when the unhairing-cylinder is in operation, and on its hub is secured a pulley 81, which at this time is belted to the pulley 15 on the shaft 12. The dimensions of the pulleys 81 and 15 are such as to revolve the unhairing-cylinder at a comparatively slow speed relative to the movement of the apron in comparison with the speed of the fleshing-cylinder. When the fleshing-cylinder is in operation, the pulleys 15, 80, and 81 are free from belts.

The operation of the machine is as follows: The parts being in their normal position, as shown in Fig. 3, the operator takes a hide and places it upon the apron 43, the hide-supporting surface of which is moving toward the rear of the machine at this time. The movement of the apron to the rear while the hide is held by the operator tends to "put out" the same and spread it flat upon the hide-support and the fixed table free from wrinkles. When the center of the hide has been fed somewhat beyond the knife-cylinder, the operator depresses the treadle 60 and nearly straightens the toggle 57 58, thereby moving the rocker-frame 29 about its pivot toward the rear of the machine, this movement causing the frames 36 to be moved about their trunnions 35 by means of the radius-arms 56 and assume the position shown in Fig. 4, with the apron 43 backed by the bed-roll 49 held firmly in contact with the knife-cylinder 22 and that portion of the apron 43 which is backed by the apron-roll 38 coöperating with the feed-rolls 66 67 to feed the hide outward. This direction of the movement of the apron 43 is effected by the tightening of the belt 41 when the frames 29 36 are moved about their pivots, thereby causing the movement of the pulley 28 to be imparted to the apron-roll 38 upon the shaft 37. The gear 40 on said shaft 37 is at the same time brought into mesh with the gears 73 73 on the feed-roll shafts 68 69, thereby causing the feed-rolls 66 67 to coöperate with said apron to feed the hide outward. The fleshing-cylinder 22 is revolved continuously at a high rate of speed by the belt $24^a$, and the hide is held in yielding contact therewith, permitting inequalities and varying thicknesses of hide to be operated upon without undue injury thereto. When one half of the hide has been operated upon, the hide is reversed and the other half is placed in a position to be acted upon by the knife-cylinder. When the operation has been accomplished, the operator removes his feet from the treadle, and the weight of the frames 29 36 being somewhat in excess of the lifting power of the springs 34 said frames fall back into their normal position by gravity.

If it is desired to unhair, the belts $24^a$ and 26 are removed, the unhairing-knife cylinder is moved into and secured in its operative position, the pulley 80 is belted to the counter-shaft, (not shown,) and the pulley 81 connected to the pulley 15 by a suitable belt. The bed-roll 47 is moved away from the apron 43 and clamped in its removed position, and the machine is ready for use for unhairing.

Having thus described my invention, I claim—

1. The combination with a hide-support, of a pair of independently-driven knife-cylinders, means for moving either of said cylinders into position to coact with said hide-support, and means independent of the driving mechanism for locking said cylinders in operative position.

2. The combination with a hide-support, of a pivoted frame, a pair of independently-driven knife-cylinders mounted in said frame, at different distances from said pivot, and means whereby either of said knife-cylinders may be brought into operative position with said hide-support.

3. The combination with a hide-support, of a pivoted frame, a pair of independently-driven knife-cylinders mounted in said frame, means whereby either of said cylinders may be brought into position to coöperate with said hide-support, and means independent of the cylinder-driving mechanism for locking said frame with a cylinder in operative position.

4. The combination with a pair of separated rolls, of an apron mounted upon said rolls, a pivoted frame, a pair of independently-driven knife-cylinders mounted in said frame at different distances from said pivot, and means whereby said frame may be moved about its pivot to bring either of said knife-cylinders into position to coöperate with said apron.

5. The combination with a hide-support, of a pivoted frame, a pair of cylinders mounted in said frame, means for moving said frame about its pivot so that either of said cylinders may be brought into position to coöperate with said hide-support, and means for revolving said cylinders at different speeds.

6. The combination with a knife-cylinder, of a feed-roll above said cylinder, an apron downwardly inclined toward said knife-cylinder, and means whereby said knife-cylinder, feed-roll and said apron may be brought into position to coöperate.

7. The combination with a knife-cylinder, of a pivoted frame, a pair of apron-rolls both having bearings in said pivoted frame at some distance from said pivot, an apron mounted upon said rolls, and means for moving said frame about its pivot to cause said apron to coöperate with said knife-cylinder.

8. The combination with a pair of separated rolls, of an unhairing-cylinder, an apron adapted to coöperate with said unhairing-cylinder at a point midway between said rolls upon which it is mounted, said apron being otherwise unsupported and unbacked when in coöperating position, and means independent of said unhairing-cylinder for moving said apron lengthwise.

9. The combination with a pair of separated rolls, of an apron mounted upon said rolls, a bed-roll located between said rolls beneath said apron, means for moving said bed-roll into and out of contact with said apron, a pivoted frame, a pair of independently-driven knife-cylinders at different distances from the pivot of said frame, and means whereby either of said cylinders may be moved into position to coöperate with said bed-roll or apron.

10. The combination with a pair of separated rolls, of an apron mounted upon said rolls, a bed-roll located between said rolls beneath said apron, a knife-cylinder for fleshing hides, a knife-cylinder for unhairing hides, means for moving said bed-roll into contact with said apron when coöperating with the fleshing-knife cylinder and away from said apron when coöperating with the unhairing-knife cylinder.

11. The combination with a knife-cylinder, of a pivoted frame, a pair of apron-rolls both having bearings in said frame at some distance from the pivot thereof, an apron mounted on said rolls, a bed-roll also carried by said frame, and adjustable beneath said apron, and means for moving said frame to cause said apron to coöperate with said knife-cylinder.

12. The combination with a knife-cylinder, of a frame pivoted to the framework of the machine, a hide-support pivoted to the free end of said pivoted frame, and a yielding device for moving said pivoted frame into position for the hide-support to coöperate with said knife-cylinder.

13. The combination with a knife-cylinder, of a frame pivoted to the framework of the machine, a hide-support pivoted to the free end of said pivoted frame, means for moving said pivoted frame into position for the hide-support to coöperate with said knife-cylinder, and a yielding device operating upon said pivoted frame to insure contact between said support and said knife-cylinder.

14. The combination with a knife-cylinder, of a hide-supporting apron, means for moving said apron in a direction to feed the hide toward the knife-cylinder when the latter is not in contact with the hide thereon, means for moving the apron to bring it into contact with said knife-cylinder, and means for moving said apron so as to feed the hide away from the knife-cylinder when the latter is operating upon the hide.

15. The combination with a knife-cylinder, of a hide-supporting apron, means for moving the hide-supporting side of said apron toward the rear of the machine when the knife-cylinder is not in operation, means for moving the same in the opposite direction when in contact with the knife-cylinder, and means for bringing said apron and knife-cylinder into coöperating position.

16. The combination with a knife-cylinder, of a pair of separated apron-rolls, an apron mounted upon said rolls, means for rotating one of said apron-rolls in one direction during the operation of the knife-cylinder, and means for moving one of said apron-rolls in the opposite direction when the knife-cylinder is not in operation.

17. The combination with a knife-cylinder, of a pair of separated apron-rolls, an apron mounted upon said rolls, means for rotating one of said apron-rolls in one direction during the operation of the knife-cylinder, means for moving one of said apron-rolls in the opposite direction when the knife-cylinder is not in operation, and means for tightening said apron.

18. The combination with a knife-cylinder, of a pair of separated apron-rolls, an apron mounted upon said rolls, means for rotating one of said rolls in one direction during the operation of the knife-cylinder, means for moving one of said apron-rolls in the opposite direction when the knife-cylinder is not in operation, a bed-roll located between the apron-rolls and under the hide-supporting surface of the apron, and means for clamping the said bed-roll in different positions.

19. The combination with a pair of knife-cylinders, of a hide-supporting apron, means for moving the apron in one direction when not in contact with a knife-cylinder, means for moving the apron in the opposite direction when in contact with a knife-cylinder, a bed-roll beneath the apron, and means for raising the bed-roll with the apron into unyielding contact with one of said knife-cylinders when it is in operation.

20. The combination with a knife-cylinder, of a pivoted rocker-frame, a secondary frame pivoted to said rocker-frame, a hide-supporting apron mounted in said secondary frame, and means for moving said frame about its pivot to cause said hide-support to coöperate with said knife-cylinder.

21. The combination with a knife-cylinder, of a pivoted rocker-frame, a secondary frame pivoted to said rocker-frame, a hide-support mounted on said secondary frame, means for moving said frames about their pivots to cause said hide-support to coöperate with said knife-cylinder, and a yielding device secured to said rocker-frame serving to move said rocker-frame about its pivot to insure contact between said support and said knife-cylinder.

22. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-support to coöperate with said knife-cylinder, and a yielding device secured to said rocker-frame serving to move said frame about its pivot to insure contact between said support and said knife-cylinder.

23. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-supporting apron to coöperate with said knife-cylinder, a yielding device secured to said rocker-frame serving to move said frame about its pivot to insure contact between said support and said knife-cylinder, and adjustable means for limiting the movement of said pivoted frames.

24. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-supporting apron to coöperate with said knife-cylinder, a yielding device secured to said rocker-frame serving to move said rocker-frame about its pivot to insure contact between said support and said knife-cylinder, and a bed-roll adjustable beneath the apron.

25. The combination with a knife-cylinder, of a feed-roll, a pivoted frame, a hide-support pivoted in the free end of said frame, and means for moving said hide-supporting frame about its pivot toward and from said knife-cylinder and said feed-roll.

26. The combination with a knife-cylinder, of a pivoted rocker-frame, a hide-support pivoted to said rocker-frame, toggle mechanism for moving said rocker-frame about its pivot, a treadle for operating said toggle, a radius-arm connecting said pivoted frame with a stationary part, and a yielding device secured to said rocker-frame and tending to move said rocker-frame about its pivot to cause said hide-support to coöperate with said knife-cylinder.

27. The combination with a knife-cylinder, of a feed-roll, an inclined hide-support movable toward and from said knife-cylinder and feed-roll, and a fixed table inclined downwardly in continuation of said hide-support.

28. The combination with a knife-cylinder, of a bed-roll, a movable hide-support interposed between said cylinder and roll, and means for moving said hide-support lengthwise in either direction to feed the hide in or out thereon.

29. The combination with a knife-cylinder, of a pivoted rocker-frame, a secondary frame pivoted to said rocker-frame, a hide-support mounted on said secondary frame, means for moving said frames about their pivots to cause said hide-support to coöperate with said knife-cylinder, and stops to limit the movement of said rocker-frame.

30. The combination with a knife-cylinder, of a bed-roll, yielding means forcing said bed-roll toward said knife-cylinder, a movable hide-support interposed between said cylinder and said bed-roll, and means for moving said hide-support lengthwise in either direction to feed the hide in or out thereon.

31. The combination with a knife-cylinder, of a pivoted rocker-frame, a secondary frame pivoted to said rocker-frame, a hide-support mounted on said secondary frame, means for moving said frames about their pivots to cause said hide-support to coöperate with said knife-cylinder, and means for limiting the movement of said secondary frame about its pivot.

32. The combination with a knife-cylinder, of a pivoted frame, a bed-roll mounted in said frame, yielding means forcing said bed-roll toward said knife-cylinder, a movable hide-support interposed between said cylinder and said bed-roll and mounted in a frame independent of and pivoted to said pivoted frame.

33. The combination with a hide-support, of a pivoted frame, a pair of independently-driven knife-cylinders mounted in said frame, means whereby said frame may be moved about its pivot to bring either of said cylinders into position to coöperate with said hide-support, and locking-bolts for clamping said pivoted frame in either of its operative positions.

34. The combination with a hide-support, of a framework, a pivoted frame provided with trunnions having bearings in said framework, disks secured to said trunnions, means for locking said disks to said framework, two knife-cylinders having bearings in said pivoted frame, and means whereby said frame may be moved about its pivot to bring either of said cylinders into position to coöperate with said hide-support.

35. The combination with a pair of separated rolls, of an apron mounted upon said rolls, a pivoted frame, a pair of knife-cylinders mounted in said frame, means for revolving said knife-cylinders at different speeds, and means for moving said frame about its pivot to bring either of said knife-cylinders into position to coöperate with said apron.

36. The combination with a knife-cylinder, of a pivoted rocker-frame, a hide-support pivoted to said rocker-frame, means for moving said rocker-frame about its pivot, and a radius-arm connecting said hide-support to a stationary part.

37. The combination with a knife-cylinder, of a pivoted rocker-frame, a hide-support pivoted to said rocker-frame, treadle mechanism for moving said rocker-frame about its pivot, and a radius-arm connecting said hide-support to a stationary part.

38. The combination with a pair of separated rolls, of an apron mounted upon said rolls, arms pivoted to the axis of one of said rolls, a bed-roll mounted in said pivoted arms, means for moving said bed-roll into and out of contact with said apron, and a knife-cylinder adapted to coöperate with said bed-roll and apron.

39. The combination with a pair of separated rolls, of an apron mounted upon said rolls, a pair of arms pivoted to the shaft of one of said rolls, a bed-roll mounted in the free end of said arms beneath said apron, a knife-cylinder for fleshing hides and a knife-cylinder for unhairing hides, means for moving said bed-roll into contact with said apron when coöperating with the fleshing knife-cylinder and away from said apron when coöperating with the unhairing knife-cylinder.

40. The combination with a knife-cylinder, of a pivoted rocker-frame, a hide-support pivoted to said rocker-frame, toggle mechanism for moving said rocker-frame about its pivot, a treadle for operating said toggle, and a radius-arm connecting said pivoted frame with a stationary part.

41. The combination with a knife-cylinder, of a pivoted rocker-frame, a secondary frame pivoted to said rocker-frame, a movable hide-supporting apron mounted in said secondary frame, a radius-arm connecting this frame with a stationary part, toggle mechanism for moving said rocker-frame about its pivot, a treadle for operating said toggle, and an adjustable roll mounted in said secondary frame beneath said apron and adapted to be moved into and out of contact therewith.

42. The combination with a knife-cylinder, of a pivoted frame, a pair of apron-rolls both having bearings in the free end of said frame, arms pivoted near one of said apron-rolls, a bed-roll mounted in the free ends of said arms and adjustable beneath said apron, and means for moving said frame to cause said apron to coöperate with said knife-cylinder.

43. The combination with a knife-cylinder, of a pivoted frame, a hide-support pivoted to the free end of said frame, a rod secured to the free end of said pivoted frame, a bearing for the lower end of said rod, a shoulder upon said rod, and a spring interposed between said shoulder and said bearing.

44. The combination with a knife-cylinder, of a pair of apron-rolls, an apron mounted upon said rolls, means for moving said apron into position to coöperate with said knife-cylinder, a feed-roll, a gear secured to and revolving with said feed-roll, an idler-gear adapted to mesh with the apron-roll gear when said apron is in its normal position, means for continuously revolving said gear, means for moving said apron-roll gear from mesh with said idler-gear into mesh with the feed-roll gear, and means for revolving said apron-roll and through the gearing the feed-roll when the hide is being operated upon.

45. The combination with a knife-cylinder, of a pivoted frame, a hide-support pivoted to the free end of said frame, means for moving said support into position to coöperate with said knife-cylinder, a rod secured to the free end of said pivoted frame, a bearing for the outer end of said rod, and a spring interposed between said bearing and said pivoted frame.

46. The combination with a knife-cylinder, of a pivoted rocker-frame, a secondary frame pivoted to said rocker-frame, a hide-support mounted in said secondary frame, means for moving said frames about their pivots to cause said hide-support to coöperate with said knife-cylinder, a fixed bearing, and a spring interposed between said bearing and said rocker-frame, serving to move said rocker-frame about its pivot to insure contact between said hide-support and said knife-cylinder.

47. The combination with a knife-cylinder, of a pivoted rocker-frame, a secondary frame pivoted to said rocker-frame, a pair of rollers having bearings in said secondary frame, a hide-supporting apron mounted upon said rollers, arms pivoted near one of said rollers, a bed-roll mounted in the free ends of said arms, means for moving said frames about their pivots to cause said hide-support to coöperate with said knife-cylinder, and means for limiting the movement of said secondary frame about its pivot.

48. The combination with a knife-cylinder, of a pivoted rocker-frame, a hide-support pivoted to said rocker-frame, means for moving said rocker-frame about its pivot, and an arm one end of which is secured to said hide-support and the other end of which is secured to a stationary part and adapted to regulate the movement of said hide-support.

49. The combination with a knife-cylinder, of a pivoted rocker-frame, a hide-support pivoted to said rocker-frame, toggle mechanism for moving said rocker-frame about its pivot, a treadle for operating said toggle mechanism, an arm one end of which is secured to said hide-support and the other end of which is secured to a stationary part, a fixed bearing, and a spring interposed between said bearing and said rocker-frame, adapted to move said rocker-frame about its pivot to cause said hide-support to coöperate with said knife-cylinder.

50. The combination with a knife-cylinder, of a pivoted rocker-frame, a hide-support pivoted to said rocker-frame, and means for moving said rocker-frame toward said knife-cylinder, and at the same time change the inclination of said hide-support relative to said rocker-frame.

51. The combination with a knife-cylinder, of a pivoted rocker-frame, a secondary frame pivoted to said rocker-frame, two rolls mounted in said secondary frame, a hide-supporting apron mounted upon said rolls, means for moving said apron about its supporting-rolls in two directions, and means for moving said rocker-frame toward said knife-cylinder and at the same time change the inclination of said hide-support relative to said rocker-frame.

52. The combination with a knife-cylinder, of a pivoted rocker-frame, a secondary frame pivoted to said rocker-frame, two rolls mounted in said secondary frame, a hide-supporting apron mounted upon said rolls, a bed-roll beneath said apron, means for moving said rolls into and out of contact with said apron, and means for moving said rocker-frame toward said knife-cylinder and at the same time change the inclination of said hide-support relative to said rocker-frame.

53. The combination with a pair of separated rolls, of an unhairing-cylinder, an apron adapted to coöperate with said unhairing-cylinder at a point midway between said rolls upon which it is mounted said apron being otherwise unsupported and unbacked when in coöperating position, and means independent of said unhairing-cylinder for moving said apron lengthwise in either direction.

Signed by me at Boston, Massachusetts, this 28th day of October, 1902.

ALBERT A. HUTCHINSON.

Witnesses:
NATHAN C. LOMBARD, 2d,
WALTER E. LOMBARD.